(12) United States Patent
Morris et al.

(10) Patent No.: US 8,429,171 B2
(45) Date of Patent: Apr. 23, 2013

(54) CONSISTENT USER EXPERIENCE IN INFORMATION RETRIEVAL SYSTEMS

(75) Inventors: Robert W. Morris, Atlanta, GA (US); Marsal Gavalda, Sandy Springs, GA (US)

(73) Assignee: Nexidia Inc., Atlanta, GA (US)

(*) Notice: Subject to any disclaimer, the term of this patent is extended or adjusted under 35 U.S.C. 154(b) by 615 days.

(21) Appl. No.: 12/193,896

(22) Filed: Aug. 19, 2008

(65) Prior Publication Data

US 2009/0055360 A1 Feb. 26, 2009

Related U.S. Application Data

(60) Provisional application No. 60/956,764, filed on Aug. 20, 2007.

(51) Int. Cl.
*G06F 17/30* (2006.01)
(52) U.S. Cl.
USPC .......................................... 707/748; 704/257
(58) Field of Classification Search .......... 704/250–257; 707/713–719, 748–751, 759–769
See application file for complete search history.

(56) References Cited

U.S. PATENT DOCUMENTS

| | | | |
|---|---|---|---|
| 2006/0206324 A1* | 9/2006 | Skilling et al. | 704/231 |
| 2006/0217966 A1* | 9/2006 | Hu et al. | 704/200 |
| 2007/0016419 A1* | 1/2007 | Lee et al. | 704/250 |
| 2007/0033003 A1 | 2/2007 | Morris | 704/9 |
| 2007/0112740 A1 | 5/2007 | Geva | 707/999.003 |
| 2007/0185831 A1 | 8/2007 | Churcher | 707/999.003 |
| 2008/0162137 A1* | 7/2008 | Saitoh et al. | 704/251 |
| 2008/0228486 A1* | 9/2008 | Claiborn et al. | 704/257 |
| 2008/0319750 A1* | 12/2008 | Potter et al. | 704/255 |
| 2009/0063148 A1* | 3/2009 | Straut et al. | 704/251 |

* cited by examiner

*Primary Examiner* — Wilson Lee
(74) *Attorney, Agent, or Firm* — Occhiuti Rohlicek & Tsao LLP

(57) ABSTRACT

An information retrieval system for search a corpus is configured to, for each of a plurality of searches of at least a subset of the corpus, generate a confidence score for each of a plurality of putative occurrences of a search query in the at least a subset of the corpus. The system is further configured to adjust a threshold to maintain a consistent user experience across the plurality of searches according to a consistency criterion. The system is further configured to display putative occurrences of the search query having a confidence score greater than the threshold.

18 Claims, 1 Drawing Sheet

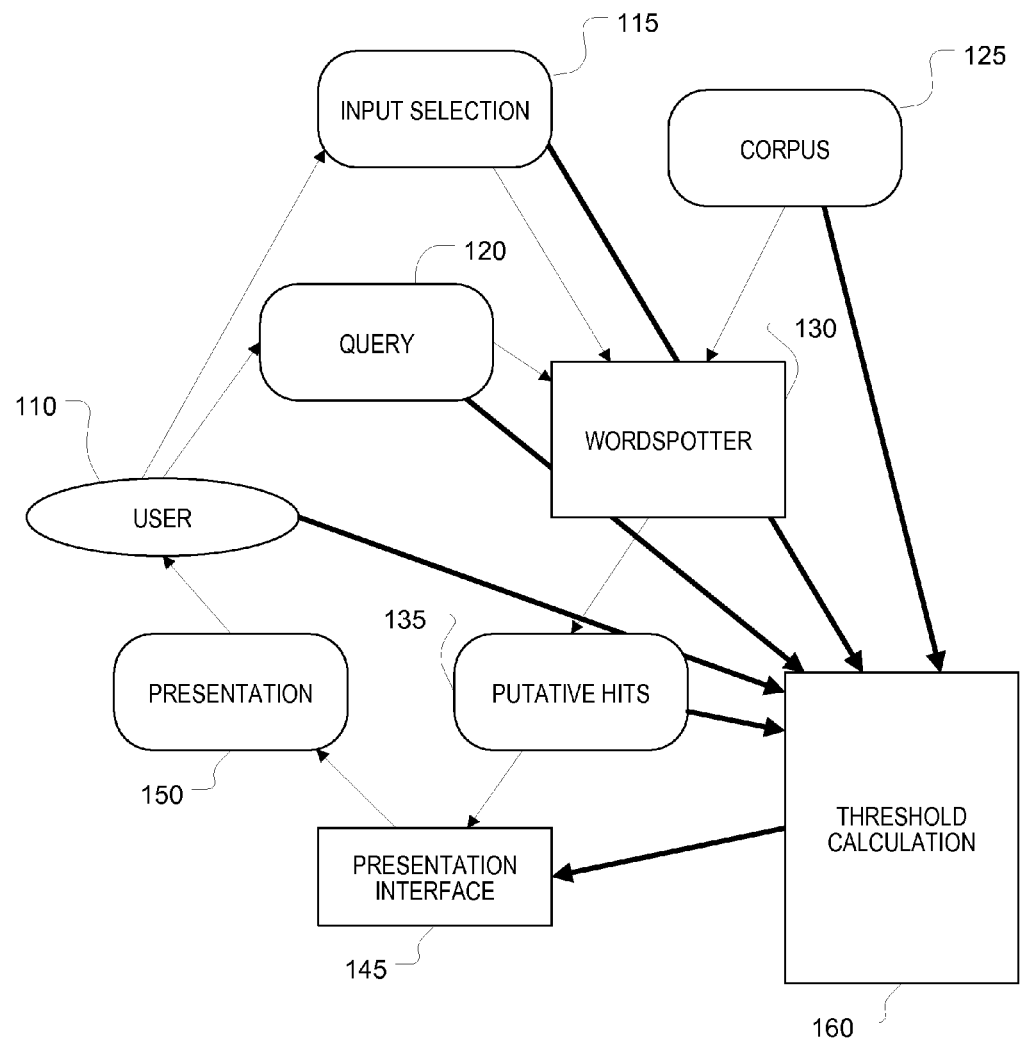

CONSISTENT USER EXPERIENCE IN INFORMATION RETRIEVAL SYSTEMS

CROSS-REFERENCE TO RELATED APPLICATIONS

This application claims the benefit of U.S. Provisional Application No. 60/956,764 filed Aug. 20, 2007, the contents of which are incorporated herein in its entirety.

BACKGROUND

This description relates to techniques for providing a consistent user experience in information retrieval systems.

In an information retrieval system (e.g., a wordspotting system), to search a corpus of documents (e.g., set of audio files) one enters a query, typically in the form of a search term or Boolean expression of search terms. Then the system returns a set of putative hits (search results) based on the search query. Each putative hit is usually associated with a score, or confidence measure, (e.g., a score ranging from 0 to 1, with 1 being "better" than 0) which allows the set of putative hits to be ranked (e.g., a list of putative hits, sorted by descending score, can be constructed) and it also allows a threshold to be applied to the set, i.e., the set is partitioned in two disjoint subsets: one subset containing putative hits equal or above a particular threshold, and the other subset containing the putative hits below that threshold. In some systems, the threshold is fixed at a particular value for all queries, whereas in other systems, the threshold is adjusted for each query.

SUMMARY

In one aspect, in general, an information retrieval system for searching a corpus is configured to operate in a manner that optimizes the consistency of a user experience given a subset of a corpus and a search query.

Aspects may include one or more of the following.

The system is further configured to generate a confidence score for putative hits from the retrieval system, and display results above a threshold to maintain consistency by some criterion.

The consistency criterion comprises a constant number of false alarms, a constant false alarm rate, a constant number of true positives, a constant precision value, a constant rate of true positives, a constant number of misses, a constant number of false negatives, and/or a constant recall value.

The information retrieval system comprises a wordspotter.

The active corpus comprises a corpus defined by metadata.

The retrieval system is further configured to modify the search algorithm to optimize the consistency criterion.

The system is configured to account for an audio quality of the active corpus in optimizing the consistency criterion.

The consistency criterion comprises a constant computation time, a constant amount of computation, or a constant amount memory used.

In another aspect, in general, a system is configured to receive a search of a corpus from a user, present the user with a list of putative hits above a certain threshold, receive a modification to the active subset of the corpus from the user, dynamically adjust the threshold, and present to the user a new list of putative hits based on the adjusted threshold.

Other features and advantages of the invention are apparent from the following description, and from the claims.

DESCRIPTION OF DRAWINGS

FIG. 1 is a block diagram of a word spotting system.

DESCRIPTION

In an information retrieval system such as a wordspotting system, a user enters a query to search a corpus of documents such as a set of audio files. The system returns a set of putative hits (search results) where each putative hit has an associated score, or confidence measure, which allows the set of putative hits to be ranked. A threshold based on the score can be used to partition the results and/or to determine which of the results to display.

In general, scores for putative hits can depend on a number of factors, including without limitation the nature of the query (e.g., the phoneme length, how typical the phoneme patterns are in the language), the nature of the audio source (e.g., the degree to which they match the training material for the wordspotting system in terms of acoustic channel, such as noise level or non-linear distortion, and match of the language, such as the type of accent or dialect in the audio files), and whether the putative hits correspond to true occurrences or if they correspond to false alarms.

In general, ranking putative hits according to their score results in true hits (detections of true occurrences of the query) being typically ranked more highly than false alarms (detections that do not correspond to true occurrences). A threshold can be set such that putative hits with scores above the threshold are presented to a user. Setting of the threshold (in conjunction with the distributions of the scores themselves) affects a number of characteristics of the set of putative hits that are presented to the user. These characteristics include a total number of putative hits presented to the user, the ratio of true hits to the number of putative hits presented (precision), the ratio of the number of true detections to the total number of true occurrences in the data (recall), the number of false alarms in the presented putative hits per unit of input data (e.g., per call, per unit of time, such as per hour or call time or active speech time), or the ratio of true detections versus false alarms. Note that some of these quantities may also be affected by the number of true query events that occur in the data being searched. For example, in an extreme in which there are no true occurrences of a query in the data, then quantities such as precision are necessarily zero.

The quality of a user experience is, in general, dependent on one or more of the quantities described above, which are in turn dependent on the setting of a score threshold for the presentation of putative hits.

In some implementations of the information retrieval system, the score threshold for presentation of putative hits is dynamically adjusted to maintain a consistent user experience across different active corpora, for example, by adjusting the thresholds for each presentation of search results. The system adjusts the threshold based on the query and/or the size and nature of the active corpus, in order to maximize the consistency of the user experience. The user experience of search results refers to user's perception of a presentation of a set of results to that user. For example, in a computer interface, a user experience of the search results occurs when the user is presented with a list of putative hits and/or when the putative hits are displayed as tick marks along a timeline representing an audio file. The active corpus refers to the set of documents currently part of the user experience, e.g., the subset of documents of the overall corpus that are active or visible at any particular time. For example, when entering a new query, the set of active documents is often the entire corpus, but when the user selects a single document (e.g., during playback of an audio file), the set of active documents becomes a singleton set containing that document only. The consistency of the user experience refers to presenting a user with a result set that optimizes a particular criterion, such as constant absolute number of false positives, constant rate of false positives, constant absolute number of true positives, or constant rate of true positives.

Inside many audio corpora, there is an underlying structure. For example, a call center corpus will consist of individual phone calls, while a corpus of news broadcasts can be structured by shows, and further subdivided into stories within a broadcast. In many cases, search results often are clustered within these subdivisions. For this reason, one might search an entire corpus of thousands of hours with a high threshold (to ensure high precision) to find a few documents of interest. Then the user can analyze the individual documents, which will have much shorter durations. Because of this much shorter duration, the threshold can be lowered to improve the recall while still maintaining an acceptable number of false positives.

For example, if the consistency criterion is constant absolute number of false positives (e.g., the user can only tolerate up to 3 false alarms per experience of search results), when the user first enters a query to search the entire corpus, the system may set a high threshold (e.g., 0.975). But when the user is visualizing the search results for a single file, e.g., when the user selects that file to be played back, the threshold for that same query might be lowered (e.g., the threshold could be lowered to 0.834). The change in the threshold maintains consistency in the user experience because in both searches the user receives search results that contain up to 3 false alarms. When the large corpus is searched the threshold is higher because only up to 3 false alarms are allowed in the entire corpus. When the single file is searched the threshold is lowered because the search results can contain up to three false alarms for that single file.

While in the example above the threshold was decreased when the corpus was limited, in some examples reducing the active media set may result in an increase in the threshold. For example, if the selected file is of lesser audio quality than the entire corpus as a whole.

In some implementations, if the consistency criterion is constant response time, the information retrieval system can change the search algorithm to reduce the computation required over a large corpus.

Referring to FIG. 1, in an example of a wordspotting system is controlled by a user 110. The user provides a query 120, such as a key phase in text form, a Boolean query with multiple terms, or a voice input of a keyphrase. The user also may select a particular portion 115 of the available input. For example, an audio corpus 125 may include thousands of recorded telephone calls, but the user is only interested in a particular subset, for example, involving a particular agent or being associated with a particular inbound telephone number. Based on the query 120 and the selected portion 115 of the input corpus 125, a wordspotter 130 generates a set of putative hits 135, each associated with a score. A presentation interface 145 selects those putative hits that are above a threshold score and forms a presentation 150 that is perceived by the user 110.

As introduced above, one aspect of providing a consistent user interface to the user relates to setting the threshold to be used by the presentation interface 145. In general, in various examples, a threshold calculation component 160 determines the appropriate threshold based on one or more factors. Some examples of these factors are as follows.

A distribution of scores of low-scoring putative hits 135 can be a factor that provides the threshold calculation with a way to estimate the distribution of scores for false alarms for the selected part of the corpus. The input selection 115 can be a factor that is used to calculate the amount of input speech being processed, for example, in setting a consistent number of false alarms per unit input (e.g., per call, per hour, etc.). The query 120 itself can be a factor for the threshold calculation, for example, according to its phonetic content. The user can also be a factor, for example, according to explicit user preferences (e.g., a desired maximum false alarm rate) or according to implicit characteristics (e.g., a novice user may have lower tolerance for false alarms than an expert user).

Note that in some examples, the process is iterative. For example, a user 110 may first select an entire corpus for analysis using a first query. Based on the results, the user may select a subset of the input, for use with that same first query or a new second query. A further factor that may be relevant to the threshold calculation component 160 is that the threshold may depend where in such an iteration the user is. For example, as the user iterates and hones in on desired data, the threshold may be lowered to provide more and more information to the user on smaller and smaller subsets of the corpus.

In some examples, the input selection 115 is performed after the execution of the wordspotter 130 in the sense that the user may have a graphical display that permits "zooming in" on a particular part of the analyzed input. In such a case, the threshold calculation may be recomputed as the user zooms in, for example, lowering the threshold to maintain a constant expected number of false alarms per displayed time interval (e.g., 3 false alarms per graphical screen width). In some examples, displays with different resolutions may be provided concurrently to the user, and each display may have a different threshold. For example, an overall timeline may have a "magnifying glass" that shows more resolution, with that increased resolution may correspond to a different (e.g., lower) threshold.

In some implementations, threshold generation is based on finding a threshold to get a constant false alarm rate. Such a threshold can be difficult to determine since putative hit lists may or may not include an unknown number of true hits. However, in some instances the statistics of higher scoring false alarms can be predicted from the lower scores. This can be useful since one can assume for the more numerous lower scoring putative hits that the results are primarily false alarms. Using this data a statistical model of the distribution of scores of false alarms is constructed. With this model, one can calculate thresholds that will produce the desired characteristics.

In some examples, the approach is to take the top 140 scores per hour. The distribution of false alarm scores is then modeled by a shifted exponential distribution:

$$p(R; F_A, F_{Min}) = \begin{cases} 0, & R < F_{Min} \\ -F_A \exp(F_A(R - F_{Min})), & R \geq F_{Min} \end{cases},$$

where R is the score, and the parameters $F_A$ and $F_{Min}$ are dependent on the audio and the search term.

In order to estimate these parameters for a given term, a search is performed on either the actual search data, or some audio that is representative of the speech of interest. Once these search results are collected, an estimation scheme (e.g., Maximum Likelihood (ML) estimation) is used to choose the model parameters.

In an example using a Maximum Likelihood (ML) estimator the observed scores are represented as the vector R. The parameters of the score distribution are then given by:

$$\hat{F}_{Min} = \min(R)$$

$$\hat{F}_A = \frac{N}{\sum_{i=1}^{N}(\hat{F}_{Min} - R_i)}.$$

One issue with this estimator is that it is susceptible to outliers and numerous true hits. For these reason, we found that an estimator based on rank-order statistics to be more suitable:

$$\hat{F}_{Min} = \min(R)$$

$$\hat{F}_A = \frac{\ln(2)}{\hat{F}_{Min} - \text{median}(R)}.$$

We are interested in the number of false alarms above a threshold, denoted by $\lambda$, so this can be expressed as a function of the cumulative density function (CDF):

$$\lambda(R; F_A, F_{Min}) = L \cdot (1 - P(R; F_A, F_{Min}))$$

$$= L \cdot (1 - (1 - \exp(-F_A F_{Min})\exp(F_A R)))$$

$$= L \cdot \exp(-F_A F_{Min})\exp(F_A R)$$

$$= \exp(F_A R + \ln(L) - F_A F_{Min})$$

where L is the rate of putative hits sampled (typically 140 Results/hour), and P is the CDF. We then define a new variable $F_B$ and write the false alarm function as:

$$F_B = F_A F_{Min} + \ln(L)$$

$$\lambda(R; F_A, F_{Min}) = \exp(F_A R + F_B)$$

Given a desired false alarm rate $\lambda$, a new threshold (T) can be set according to:

$$T(\lambda) = \frac{\ln(\lambda) - F_B}{F_A}$$

Although the method described above performed well in many examples, other implementations are can also be used. For example, some other implementations may provide higher accuracy in the case of common terms in a query. The use of the rank-order statistics based estimator mitigates many of the problems associated with true hits occurring in the model training data. However, if there is an extremely common phrase (more than 30 occurrences per hour), then this can result in thresholds that are much higher than desired. However, in many cases these very common phrases can be detected since the results have dramatically different distributions from results that consist only of false alarms.

In these implementations, we introduce $\hat{H}^{(k)}$, which is the estimated number of true hits in the audio. This value is estimated iteratively along with updates for $\hat{F}_A^{(k)}$, where the superscript k represents the iteration number. This procedure is repeated for a fixed number of iterations, which is 10 in our implementation.

The model parameter update is given by:

$$\hat{F}_{Min} = \min(R); \hat{F}_A^{(k)} = \ln(2)/((R_{N-\hat{H}^{(k)}/2}) - \hat{F}_{min})$$

where N is the number of raw scores in R, and $R_{N-\hat{H}^{(k)}/2}$ is an order statistic. The iterations are initialized with $\hat{H}^{(0)} = 0$. Estimation of $\hat{H}^{(k)}$ is given by the following pseudocode with the assumption that that the raw scores R have been sorted

```
for i=0:N-1 do
    S = F̂_A^(k)(R_i - F̂_Min)
    C = N - i
    Diff = C - N exp(S)
    if (S > 2) then
        Ĥ^(k) = max(Ĥ^(k), Diff)
```

This method simply looks at the higher scores and finds the point of maximum deviation from the statistical model. In this process, the underlying false alarm parameters are more robust and an estimate for the true hits is also generated.

It is to be understood that the foregoing description is intended to illustrate and not to limit the scope of the invention, which is defined by the scope of the appended claims. Other embodiments are within the scope of the following claims.

What is claimed is:

1. A computer implemented information retrieval system for searching a corpus, the system comprising:
   a computer;
   a scoring module configured to, for each of one or more searches of at least a subset of the corpus, generate a confidence score for each of one or more putative occurrences of a search query in the at least a subset of the corpus;
   a threshold module configured to adjust a threshold to maintain a consistent user experience across the one or more searches according to a consistency criterion, wherein the threshold is adjusted according to at least one of a duration of the at least a subset of the corpus or an audio quality of the at least a subset of the corpus; and
   a display module configured to display putative occurrences of the search query having a confidence score greater than the threshold;
   wherein the consistency criterion is selected from the group consisting of
   a constant number of false alarms in the putative occurrences of the search query for each of the one or more searches,
   a constant false alarm rate in the putative occurrences of the search query for each of the one or more searches,
   a constant number of true occurrences of the search query for each of the one or more searches,
   a constant precision value in the putative occurrences of the search query for each of the one or more searches,
   a constant number of missed occurrences of the search query for each of the one or more searches, and
   a constant recall value in the putative occurrences of the search query for each of the one or more searches.

2. The system of claim 1, wherein the consistency criterion comprises a constant number of false alarms in the putative occurrences of the search query for each of the one or more searches.

3. The system of claim 1, wherein the consistency criterion comprises a constant false alarm rate in the putative occurrences of the search query for each of the one or more searches.

4. The system of claim 1, wherein the consistency criterion comprises a constant number of true occurrences of the search query for each of the one or more searches.

5. The system of claim 1, wherein the consistency criterion comprises a constant precision value in the putative occurrences of the search query for each of the one or more searches.

6. The system of claim 1, wherein the consistency criterion comprises a constant number of missed occurrences of the search query for each of the one or more searches.

7. The system of claim 1, wherein the consistency criterion comprises a constant recall value in the putative occurrences of the search query for each of the one or more searches.

8. The system of claim 1, wherein the information retrieval system comprises a wordspotter.

9. The system of claim 1, wherein the active corpus comprises a corpus defined by metadata.

10. A computer implemented information retrieval system for searching a corpus, the system comprising:
a computer;
a scoring module configured to, for each of one or more searches of at least a subset of the corpus, generate a confidence score for each of one or more putative occurrences of a search query in the at least a subset of the corpus;
a threshold module configured to adjust a threshold to maintain a consistent user experience across the one or more searches according to a consistency criterion, wherein the threshold is adjusted according to at least one of a duration of the at least a subset of the corpus or an audio quality of the at least a subset of the corpus; and
a display module configured to display putative occurrences of the search query having a confidence score greater than the threshold;
wherein
the retrieval system is further configured to modify the search algorithm to optimize the consistency criterion, and
the consistency criterion is selected from the group consisting of
a constant computation duration for each of the plurality of searches, and
a constant amount of memory used for each of the one or more searches.

11. The system of claim 10, wherein the system is configured to account for an audio quality of the active corpus in optimizing the consistency criterion.

12. The system of claim 10, wherein the consistency criterion comprises a constant computation duration for each of the plurality of searches.

13. The system of claim 10, wherein the consistency criterion comprises a constant amount of memory used for each of the one or more searches.

14. The system of claim 1, wherein the threshold is adjusted according to a characteristic of the user.

15. The system of claim 1, wherein the threshold is adjusted according to the search query.

16. The system of claim 1, wherein the putative occurrences of a search query include portions of an audio file.

17. A computer implemented information retrieval system for searching a corpus, the system comprising:
a computer;
a scoring module configured to, for each of one or more searches of at least a subset of the corpus, generate a confidence score for each of one or more putative occurrences of a search query in the at least a subset of the corpus;
a threshold module configured to adjust a threshold to maintain a consistent user experience across the one or more searches according to a consistency criterion, wherein the threshold is adjusted according to the search query; and
a display module configured to display putative occurrences of the search query having a confidence score greater than the threshold;
wherein the consistency criterion is selected from the group consisting of
a constant number of false alarms in the putative occurrences of the search query for each of the one or more searches,
a constant false alarm rate in the putative occurrences of the search query for each of the one or more searches,
a constant number of true occurrences of the search query for each of the one or more searches,
a constant precision value in the putative occurrences of the search query for each of the one or more searches,
a constant number of missed occurrences of the search query for each of the one or more searches, and
a constant recall value in the putative occurrences of the search query for each of the one or more searches.

18. A computer implemented information retrieval system for searching a corpus, the system comprising:
a computer;
a scoring module configured to, for each of one or more searches of at least a subset of the corpus, generate a confidence score for each of one or more putative occurrences of a search query in the at least a subset of the corpus;
a threshold module configured to adjust a threshold to maintain a consistent user experience across the one or more searches according to a consistency criterion, wherein the threshold is adjusted according to the search query; and
a display module configured to display putative occurrences of the search query having a confidence score greater than the threshold;
wherein
the retrieval system is further configured to modify the search algorithm to optimize the consistency criterion, and
the consistency criterion is selected from the group consisting of
a constant computation duration for each of the plurality of searches, and
a constant amount of memory used for each of the one or more searches.

* * * * *